United States Patent [19]

Kowalski

[11] Patent Number: 5,104,071
[45] Date of Patent: Apr. 14, 1992

[54] ANTITHEFT MOUNT FOR VEHICLE APPLIANCE

[76] Inventor: Randolph E. Kowalski, 637 Scottsdale, Richardson, Tex. 75080

[21] Appl. No.: 603,106

[22] Filed: Oct. 25, 1990

[51] Int. Cl.⁵ ............................................. G12B 9/00
[52] U.S. Cl. .................................. 248/27.1; 455/345
[58] Field of Search ............... 248/27.1, 201, 27.3, 248/674, 675; 455/345

[56] References Cited

U.S. PATENT DOCUMENTS

| | | |
|---|---|---|
| 4,582,290 | 4/1986 | Baron . |
| 4,742,978 | 5/1988 | Ponticelli ........................ 248/27.1 |
| 4,848,716 | 7/1989 | Nakamoto . |
| 4,858,067 | 8/1989 | Rochelle ......................... 248/27.1 |
| 4,868,715 | 9/1989 | Putman et al. . |
| 4,895,326 | 1/1990 | Nimpoeno et al. . |
| 4,911,386 | 3/1990 | Putman et al. . |
| 4,913,382 | 4/1990 | VanAcker . |

Primary Examiner—Ramon O. Ramirez
Assistant Examiner—Robert A. Olson
Attorney, Agent, or Firm—David L. McCombs

[57] ABSTRACT

An appliance mounting apparatus is provided for securing an appliance such as a radio to a vehicle instrument panel structure. A radio mount replacement bracket is secured to the inner wall of the vehicle instrument panel structure within the opening for receiving the appliance. The replacement bracket includes a first leg engaging the inner wall and a second leg extending from the first leg into the opening, with the second leg having tabs which replace the normally provided plastic mounting tabs of the structure. An upper reinforcement plate overlies the wall of the instrument structure opposite the first leg of the replacement bracket, for securing the plate, the wall and the first leg together with threaded fasteners. A brakcet is attached to the appliance radio having tabs which extend from the appliance and align with the tabs of the replacement bracket. The tabs of the appliance and the tabs of the replacement bracket are intersecured with rivets to support the appliance in place.

14 Claims, 2 Drawing Sheets

5,104,071

ANTITHEFT MOUNT FOR VEHICLE APPLIANCE

FIELD OF THE INVENTION

The present invention relates generally to appliance mounting apparatus for a vehicle instrument panel and more particularly provides a mounting apparatus of the foregoing type which deters forcible removal of the appliance from the instrument panel.

BACKGROUND OF THE INVENTION

Appliances such as audio devices including radios, tape and compact disc players, for example, which are mounted in a conventional manner to the instrument panel of vehicle, are easily, and hence frequently, stolen. The instrument panel of most vehicles is constructed of plastic, thus facilitating the forcible removal of a factory installed or other appliance since the plastic mounting tabs or other components of the instrument panel supporting the appliance in place may be readily broken. The foregoing results in permanent damage to the instrument panel because the mounting tabs or components supporting the appliance are often cast as a single piece with a larger portion of the instrument panel structure. Replacement of the appliance in many cases thus also requires replacement of the entire instrument structure or large portions thereof.

Accordingly, it is desirable that the appliance mounting components of a vehicle instrument panel be reinforced in a manner to deter forcible removal of the appliance by breakage of the plastic mounting components. Once a vehicle instrument panel has been vandalized or otherwise damaged by forcible removal of an appliance, it is desirable that the appliance be replaceable without the undue expense and hardship of replacing entire portions of the instrument panel structure.

SUMMARY OF THE INVENTION

It is therefore an object of the present invention to provide an appliance mounting apparatus for a vehicle instrument panel which constitutes an improvement over conventional mounting arrangements.

It is a further object of the present invention to provide an appliance mounting apparatus of the above type which enables an appliance to be permanently installed.

It is a still further object of the present invention to provide an appliance mounting apparatus of the above type which deters forcible removal of the appliance from the instrument panel.

It is a still further object of the present invention to provide an appliance mounting apparatus of the above type which enables installation of an appliance in an instrument panel having damaged mounting components.

Toward the fulfillment of these and other objects, the appliance mounting apparatus of the present invention comprises a radio mount replacement bracket secured to the inner wall of a vehicle instrument panel structure within the opening for receiving an appliance such as a radio. An upper reinforcement plate is also provided which overlies the wall of the instrument panel structure opposite a first leg of the replacement bracket. Threaded fasteners extend through the plate, the wall and the first leg of the replacement bracket to the wall. The replacement bracket includes a second leg having tabs extending into the opening of the structure which serve to replace the mounting tabs normally provided with the structure supporting the radio. A bracket attached to the radio has tabs which extend from the radio and align with the tabs of the replacement bracket. The respective tabs of the replacement bracket and the radio bracket are intersecured with rivets to support the radio in place. A reinforcement bracket may also overly the radio bracket having tabs which correspond to the radio bracket tabs. Thus assembled, the mounting apparatus can be utilized to replace the mounting tabs of a damaged instrument panel structure. The mounting apparatus also supports the radio in a manner which deters its forcible removal from the instrument panel structure.

DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DESCRIPTION OF THE PREFERRED EMBODIMENTS

Figure 1:
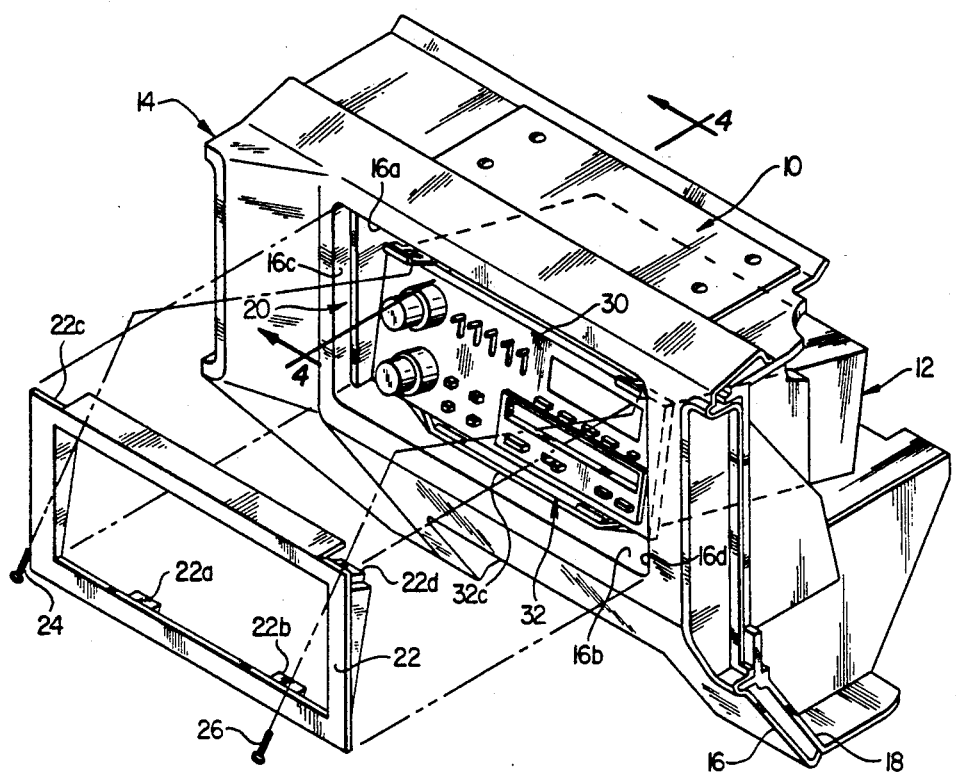
FIG. 1 is a partial perspective view depicting the mounting apparatus of the present invention supporting a radio in a vehicle instrument panel.

Referring to FIG. 1 of the drawings, the reference numeral 10 refers generally to a mounting apparatus adapted to secure an appliance such as a radio 12 to a vehicle instrument panel structure 14. Portions only of the structure 14 are illustrated as are necessary for an understanding of the present invention, it being understood that the remainder of the instrument panel structure is used to house components consisting primarily of instrumentation devices such as gauges and the like, according to the type of vehicle and the particular vehicle design containing the instrument panel structure.

A molded plastic exterior shell 16 interfits in a conventional manner with a molded plastic interior shell 18 to form the instrument panel structure 14. While not shown, it is understood that the exterior shell 16 may include a padded fascia and other cosmetic and safety features. An opening 20 is defined by an upper wall 16a, a lower wall 16b and side walls 16c and 16d of the exterior shell 16 to receive the radio 12.

A bezel 22 covers the space remaining in the opening 20 between the radio 12 and the walls 16a–16d. The bezel 22 includes attachment tabs 22a and 22b extending from a lower portion of the bezel, and engagement surfaces 22c and 22d extending from the side and upper portions of the bezel. Threaded fasteners 24, 26 secure the bezel 22 in place over the radio 12 in a manner to be subsequently described.

Figure 2:
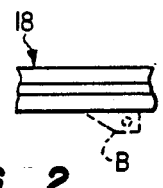
FIG. 2 is a front elevational view in partial section depicting the mounting tabs A and B of the instrument panel of FIG. 1.
Figure 3:
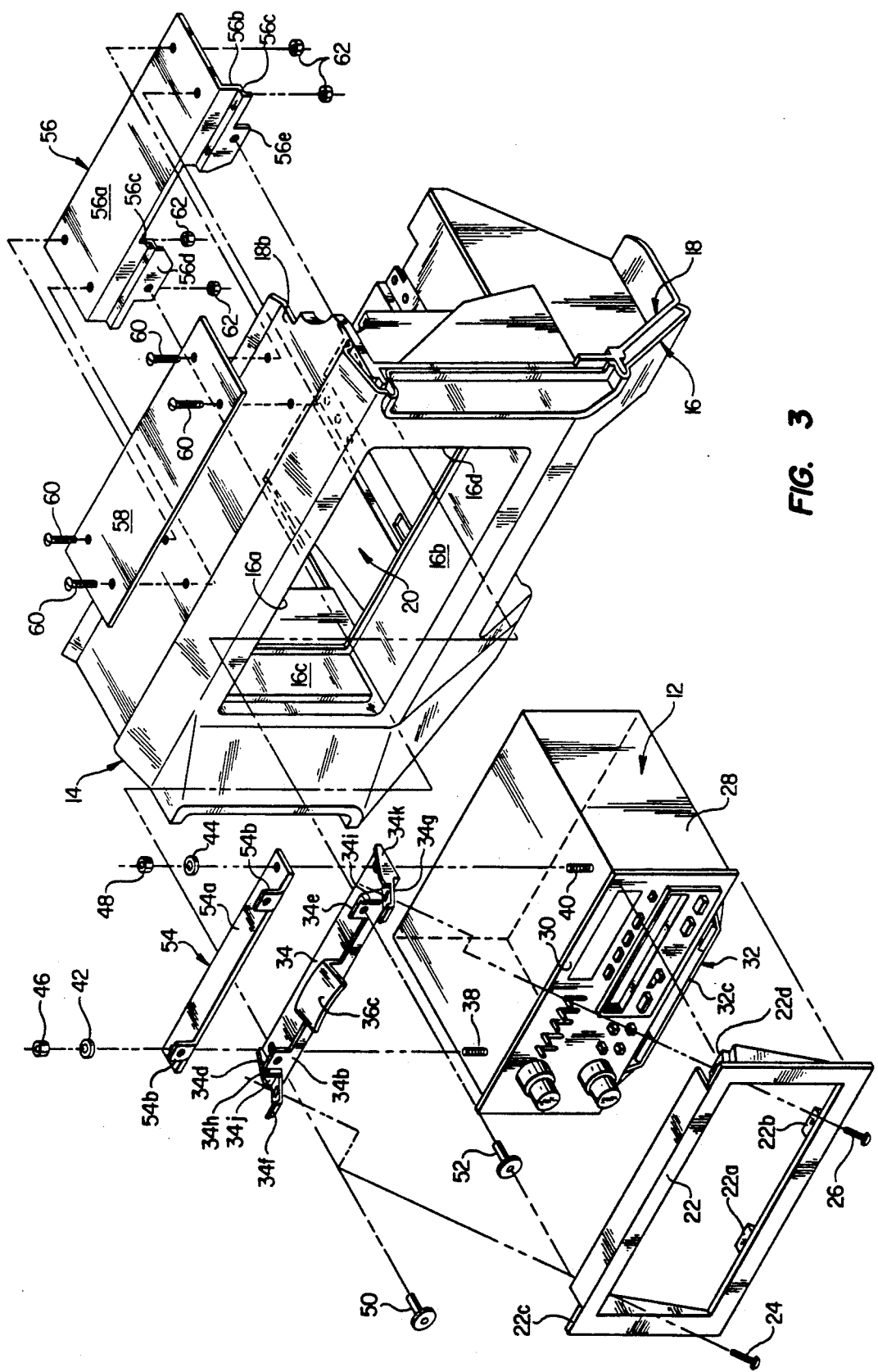
FIG. 3 is an exploded, partial perspective view depicting the mounting apparatus, radio and instrument panel of FIG. 1.

Referring also to FIGS. 2 and 3, a lip 18a of the interior shell 18 further defines the opening 20 for receiving the radio 12. Spaced-apart tabs A and B (FIG. 2) normally extend into the opening 20 from an upper portion of the lip 18a for mounting the radio 12 to the structure 14 in a conventional manner, as will be discussed. The tabs A and B are typically plastic and cast as a part of the shell 18. The tabs A and B are readily broken off by forcible removal of the radio 12 from the structure 14, and hence are shown in phantom in FIG. 2 and are omitted in the remaining drawings. It is understood that the tabs A and B are replaceable using the mounting apparatus 10, as subsequently described.

Figure 4:
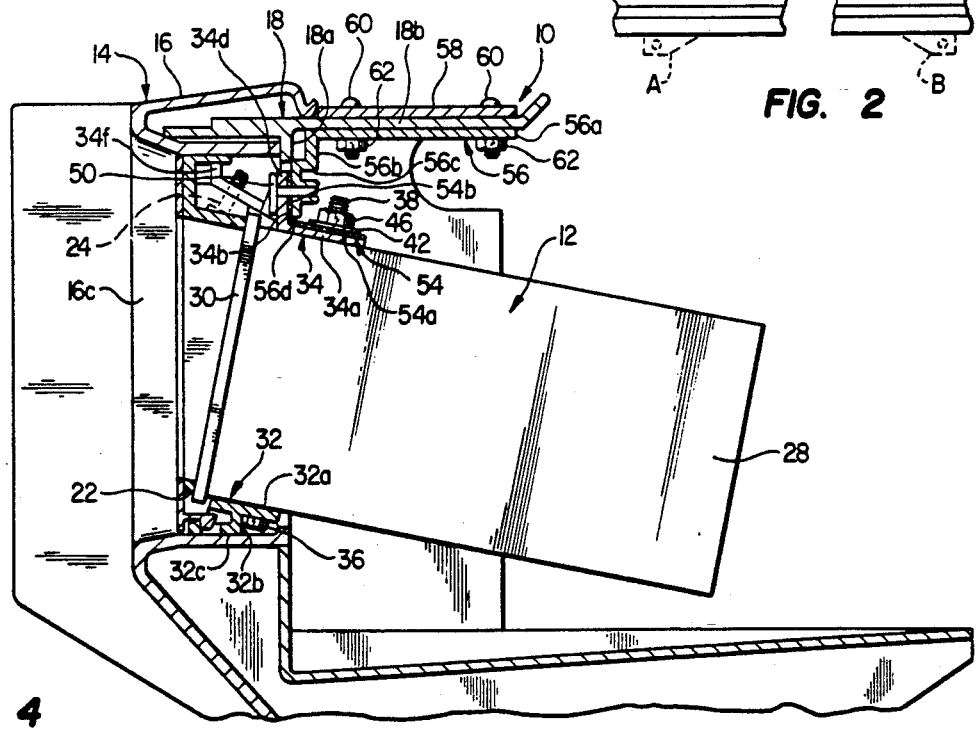
FIG. 4 is an enlarged, side-elevational view in partial section depicting the mounting apparatus of the present invention taken along line 4—4 of FIG. 1.

Referring to FIGS. 3 and 4, the radio 12 includes an outer casing 28 and a face plate 30. A lower support bracket 32 and an upper mounting bracket 34 are connected, respectively, to the lower and upper surfaces of the casing 28. The support bracket 32 and the mounting bracket 34 are normally provided with the radio 12 and the instrument panel structure 14 by the original equipment manufacturer and are used to mount the radio 12 to the structure 14 in a conventional manner, as described below. The support bracket 32 and the mounting bracket 34 are normally constructed of molded plastic.

A plate section 32a of the support bracket 32 engages the lower, forward surface of the casing 28 just behind the faceplate 30. Two openings (not shown) are defined in the section 32a for receiving two threaded fasteners, respectively, one of which is shown in FIG. 3 and is designated by the reference numeral 36, for connecting the bracket 32 to the casing 28. First and second legs 32b and 32c of the bracket 32 are formed integrally with the plate section 32a and extend outwardly therefrom and at an angle with respect to each other. The leg 32b supports the leg 32c relative to the plate section 32a of the bracket 32. The leg 32c of the bracket 32 engages the lower wall 16b of the exterior shell 16 for supporting the radio 12 relative to the structure 14.

A first leg 34a of the upper mounting bracket 34 engages the upper, forward surface of the casing 28 just behind the faceplate 30. Threaded stud mounts 38 and 40 project outwardly through the casing 28 and through openings defined in the leg 34a. Washers 42, 44 and threaded nuts 46, 48 are received by the respective stud mounts 38 and 40 over the leg 34a to hold the leg of the bracket 34 in place against the casing 28. A second leg 34b of the bracket 34 extends at a ninety degree angle from the first leg 34a, along a central portion of the length of the first leg. The second leg 34b includes a shroud 34c and tabs 34d and 34e. The shroud 34c serves to house a light (not shown) for illuminating the faceplate 30. Tabs 34d, 34e extend at an angle slightly greater than ninety degrees from the first leg 34a, and define openings for receiving fasteners, or rivets 50 and 52, to secure the bracket 34 to the structure 14, as will be discussed. Additional tabs 34f and 34g of the bracket 34 extend at an angle substantially greater than ninety degrees but less than one hundred eighty degrees, forwardly from the ends of the length of the first leg 34a of the bracket 34, adjacent to the tabs 34d, 34e, respectively. The tabs 34f, 34g support the bezel 22 over the faceplate 30 by receiving the threaded fasteners 24, 26 in the openings defined in the respective tabs. Support walls 34h, 34i of the bracket 34 are provided between the tabs 34d, 34f and the tabs 34e, 34g, respectively, to reinforce the tabs relative to each other and the remainder of the bracket 34. End walls 34j, 34k similarly reinforce the respective end tabs 34f, 34g.

The mounting apparatus 10 includes a radio mount reinforcement bracket 54, an instrument panel tab replacement bracket 56 and an upper reinforcement plate 58. The apparatus 10 may be installed to repair a damaged instrument panel structure 14 in which the tabs A and B extending from the lip 18a of the shell 18 have been broken away by forcible removal of the radio 12, or installed as a preventative measure to deter forcible removal of the radio. The brackets 54 and 56 and the plate 58 are constructed of metal or other suitably rigid material.

The bracket 54 overlies the bracket 34 in a nested relationship with respect thereto for reinforcing the bracket 34. A first leg 54a and a second leg 54b of the reinforcement bracket 54 are angled with respect to each other at slightly greater than 90 degrees to match the angle between the first leg 34a and the tabs 34d, 34e of the bracket 34. Openings defined in the first leg 54a of the bracket 54 correspond with the openings in the first leg 34a of the bracket 34 so that the stud mounts 38 and 40 extend through the openings in the leg 54a. The washers 42, 44 and the threaded nuts 46, 48 are advanced over the stud mounts 38 and 40, respectively, to secure the bracket 54 over the bracket 34 and to the casing 28. The second leg 54b of the bracket 54 is cut away along its central portion and at the ends to define tabs which correspond to the tabs 34d, 34e of the bracket 34. The tabs of the second leg 54b cover the tabs 34d, 34e and include openings defined therein corresponding to the openings in the tabs 34d, 34e.

The replacement bracket 56 includes a first leg 56a and a second leg 56b angled with respect to each other at ninety degrees. The first leg 56a engages the underside of a horizontally-disposed and flat upper wall portion 18b of the interior shell 18. The second leg 56b is stepped to define a shoulder 56c and has tabs 56d and 56e each extending from the shoulder also at ninety degrees with respect to the first leg 56a. A notch is defined in the central portion of the second leg 56b between the tabs 56d, 56e thereby providing space for the light (not shown) extending from the back of the shroud 34c of the bracket 34 when the bracket 56 is in engagement with the brackets 54 and 34, as will be discussed. The tabs 56d, 56e are also bevelled along their respective inner, longitudinal edges and define notches at their outer corners, to insure their unobstructed alignment and flush engagement with the brackets 54 and 34. Openings are defined in the tabs 56d, 56e for receiving the rivets 50 and 52, as will be described.

The plate 58 engages the top side of the upper wall portion 18b of the shell 18 and reinforces the wall in supporting the replacement bracket 56. Threaded fasteners 60 extend through the plate 56, the wall portion 18b and the first leg 56a of the bracket 56. Threaded nuts 62 are advanced over the fasteners 60 to secure the plate 58, the wall portion 18b and the leg 56a together.

For a conventional installation of the radio 12 in the instrument panel structure without using the mounting apparatus 10, the upper and lower brackets 32, 34 are secured to the casing 28 as previously mentioned. The radio 12 is received in the opening 20 and the second leg 32c of the bracket 32 rests against the lower wall 16b of the structure 16 to support the weight of the radio. The radio 12 is tilted back slightly in the opening 20 so that the weight of the radio causes the tabs 34d and 34e of the upper bracket 34 to engage the tabs A and B of the interior shell 18. The openings defined in the tabs 34d, 34e and the corresponding openings in the tabs A and B align with each other so that the respective tabs may be intersecured by threaded fasteners (not shown). Optionally, an additional bracket member (not shown) may be connected to the casing 28 at the lower end of the casing away from the face plate 30, to secure the bottom of the casing to the interior shell 18. The bezel 20 may then be secured over the radio faceplate 30 and the space between the opening 20 and the faceplate by advancing the fasteners 24, 26 through the openings in the engagement surfaces 22c, 22d and into the openings in the tabs 34f, 34g of the bracket 34. Thus installed, the radio 12 is susceptible to forcible removal from the opening 20 since both the tabs A and B and the tabs 34d, 34e of the bracket 34 connected to the tabs A and B, are constructed of plastic. Forcible removal of the radio 12 will result in breakage of the tabs A and B and for the radio to be reinstalled, the instrument panel structure 14 normally must be replaced to provide new tabs A and B.

Installation of the radio 12 in the instrument panel structure 14 using the mounting apparatus 10 will now be described. The lower bracket 32 is secured to the casing 28 as previously discussed. The upper bracket 34 is inserted over the stud mounts 38 and 40 with the upper bracket 34 engaging the surface of the casing 28. For added strength, the reinforcement bracket 54 may then be inserted over the stud mounts 38, 40 overlying the bracket 34. The washers 42, 44 and the threaded nuts 46, 48 are advanced over the stud mounts 38 and 40, respectively, connecting the brackets 34 and 54 securely to the casing 28.

When the apparatus 10 is installed to repair a damaged instrument panel structure 14 after the radio 12 has been forcibly removed, the tabs A and B of the interior shell 18 likely have been broken away. For an installation of the apparatus 10 as a preventative measure to deter forcible removal of the radio 12, or where the tags A and B have not been fully broken away, the tabs A and B of the interior shell 18 are removed by carefully cutting the tabs away with a razor saw, for example.

The replacement bracket 56 is inserted in the opening 20 and placed so that the first leg 56a engages the underside of the flat, upper wall portion 18b of the interior shell 18. By sliding the bracket 56 along the wall portion 18b toward the front of the opening 20, the shoulder 56c of the second leg 56b engages the end surface of the interior shell lip 18b. The bracket 56 is thus self-aligned with respect to the structure 14 and held in place until it is permanently secured to the wall portion 18b, as will be discussed. A silicone adhesive may also be applied between the top surface of the first leg 56a and the wall portion 18b to further secure the bracket 56 to the wall portion 18b and hold it in place until permanently secured, as discussed below.

The plate 58 is then placed on the top side of the upper wall portion 18b of the shell 18 in alignment with the first leg 54a on the underside of the wall portion 18b. Silicone adhesive may also be applied to the underside of the plate 58 for adhering the plate to the wall portion 18b. Openings are then drilled at each corner of the plate 58 through the wall portion 18b and through the first leg 56a. A C-clamp, locking pliers or the like may be utilized to clamp the plate 58 and the first leg 56a of the replacement bracket 56 together against the wall portion 18b while the holes are being drilled. The fasteners 60 are then inserted in each of the openings in the plate 58 and through the wall portion 18b and the first leg 56a. The threaded nuts 62 are then advanced over the fasteners 60 to secure the plate 58 and the bracket 56 tightly in engagement with the wall 18b. Thread locking compound may also be applied to the fasteners 60 if desired.

The radio 12 is then received in the opening 20 and the second leg 32c of the bracket 32 rests against the lower wall 16b to support the weight of the radio, as previously mentioned. The radio 12 is tilted back slightly in the opening 20 so that the weight of the radio causes the tabs formed by the second leg 54b of the reinforcement bracket 54 to engage the tabs 56d, 56e of the replacement bracket 56. The openings defined in the tabs 34d, 34e of the mounting bracket 34, the openings defined in the tabs of the reinforcement bracket 54, and the openings defined in the tabs 56d, 56e of the replacement bracket align with each other. The respective tabs are then intersecured by the rivets 50 and 52 which secures the radio 12 permanently to the instrument panel structure 14.

It is thus seen that the mounting apparatus 10 provides a secure connection between the radio 12 and the instrument panel structure 14 so that the radio 12 may not be forcibly removed without removal of the rivets 50 and 52. Potential damage to the radio mounting bracket 34 is further minimized by the reinforcement bracket 54. In addition to replacing the tabs A and B of the structure 16, the replacement bracket 56 allows for a much stronger connection of the mounting bracket 34 and reinforcement bracket 56 assembly to the structure 14. By use of the rivets to secure the respective tabs of the mounting, reinforcement and replacement brackets the radio 12 may not be removed easily without a drill or other implement to remove the rivets. Further, the plate 58 reinforces the connection of the replacement bracket to the wall 18b thus eliminating potential damage to the wall.

It is understood that several variations may be made to the foregoing without departing from the scope of the invention. For example, although the mounting apparatus of the present invention had been described in association with a specific configured dashboard structure 14, radio 12 and attendant original equipment mounting bracket assembly, it is understood that it is also adaptable to connect other radios and instrument panel structures in the manner described above.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for securing an appliance to an instrument panel structure having walls defining an opening for receiving said appliance, said apparatus comprising:
   means for connecting to and extending from said appliance for providing at least one appliance mounting surface;
   bracket means for connecting to one of said structure walls and for securing said appliance to said one wall, said bracket means including a bracket member having a first leg for engaging the surface of said one wall and a second leg for extending into said openings, said second leg including at least one bracket mounting surface for connecting to said at least one appliance mounting surface; and,
   fastening means for securing together said at least one appliance mounting surface and said at least one bracket mounting surface for holding said appliance in place relative to said structure.

2. The apparatus of claim 1 wherein said bracket means further comprises a plate member for engaging a surface of said one wall opposite said surface engaged by said first leg, and fastening members for extending through and securing together said plate, said one wall and said first leg.

3. The apparatus of claim 1 wherein said one wall further comprises a lip portion and said second leg of said bracket member is stepped to define a shoulder for engaging said lip portion.

4. The apparatus of claim 1 wherein said at least one appliance mounting surface comprises spaced apart tabs each defining an opening for receiving said fastening means.

5. The apparatus of claim 1 wherein said at least one bracket mounting surface comprises spaced apart tabs each defining an opening for receiving said fastening means.

6. The apparatus of claim 1 wherein said fastening means comprises at least one rivet.

7. The apparatus of claim 1 wherein said means for connecting to and extending from said appliance comprises an appliance bracket member having a first leg for connecting to said appliance and a second leg including said at least one appliance mounting surface.

8. The apparatus of claim 7 wherein said means for connecting to and extending from said appliance further comprises a reinforcement bracket member comprising a first leg overlying said first leg of said appliance bracket member and a second leg overlying said second leg of said appliance bracket member, said second leg of said reinforcement bracket member including at least one reinforcing mounting surface for aligning with said at least one appliance mounting surface of said appliance bracket member.

9. The apparatus of claim 8 wherein said fastening means secures together said at least one appliance mounting surface and said at least one bracket mounting surface for holding said appliance in placed relative to said structure.

10. Apparatus for securing an appliance to an instrument panel structure having walls defining an opening for receiving said appliance, said apparatus comprising:
an appliance bracket member having a first leg for connecting to said appliance and a second leg for extending from said first leg outwardly from said appliance, said second leg including spaced apart appliance mounting tabs;
a wall bracket member for connecting to one of said structure walls for securing said appliance to said one wall, said appliance bracket member including a first leg for engaging the surface of said one wall and a second leg for extending from said first leg into said opening, said second leg including spaced apart bracket mounting tabs for alignment with said appliance mounting tabs; and
fastening means for securing together said appliance mounting tabs and said bracket mounting tabs.

11. The apparatus of claim 10 further comprising a plate member for engaging a surface of said one wall opposite said surface engaged by said first leg of said wall bracket member, and fastening members for extending through said plate member, said one wall and said first leg for intersecting said plate member, said one wall and said first leg.

12. The apparatus of claim 10 further comprising a reinforcing bracket member for connecting to said appliance and for reinforcing said appliance bracket member, said reinforcing bracket member including a first leg for engaging said first leg of said appliance bracket member and a second leg for extending from said first leg and including spaced apart tabs, said spaced apart tabs for engaging said appliance mounting tabs, said fastening means for securing together said appliance mounting tabs, said tabs of said reinforcing bracket member and said bracket mounting tabs.

13. The apparatus of claim 10 wherein said one wall further comprises a lip portion extending into said opening, and said second leg of said wall bracket member is stepped to define a shoulder for engaging said lip portion.

14. The apparatus of claim 10 wherein said fastening means comprises at least one rivet.

* * * * *